Patented Mar. 11, 1930

1,750,230

UNITED STATES PATENT OFFICE

HENRY LEITNER, OF LONDON, ENGLAND

ELECTRIC ACCUMULATOR

No Drawing. Application filed March 28, 1929, Serial No. 350,797, and in Great Britain March 27, 1928.

This invention relates to electric accumulators of the kind in which the active material of the positive plate consists of peroxide of lead.

It has been found that when a solution of sulphate of ammonia and small quantities of glycerine have been employed for moistening the powdered lead oxide in order to form a plastic mass for pasting the same into the grids a positive plate of increased discharging capacity at high rates is produced. The active material, however, is of a somewhat soft nature. On the other hand, glycerine diluted with water and used by itself for binding the powdered lead produces a good setting paste but the formation of positive plates becomes difficult or impossible. The greater the percentage of glycerine present, the greater the hardness, cohesion and setting of the paste, and therefore, a better negative plate results which forms readily, whilst a positive plate will not form at all.

The object of the present invention is to produce an active material having the combined advantages indicated above.

The invention comprises a process of forming a plastic mass for accumulator grids which consists in saturating a solution of glycerine diluted with water, with sulphate of magnesium, sulphate of sodium or potassium, and thereafter using the said solution for working powdered lead monoxide into a stiff paste.

Further, according to the invention the powdered lead monoxide may be admixed with crystals of the aforesaid sulphates prior to mixture with the saturated solution above mentioned.

Again the present invention consists in an accumulator plate made with the plastic mass set forth in either of the preceding paragraphs.

Further the present invention comprises an accumulator plate wherein the grid thereof is filled with a plastic mass comprising a solution of glycerine diluted with water and saturated with either of the sulphates of magnesium or sodium or potassium.

In a suitable arrangement for carrying the invention into effect, the glycerine is preferably used at three quarters the usual commercial concentration, the diluent being water. The solution thus obtained is saturated preferably with sulphate of magnesium and used to work powdered lead monoxide into a paste. The lead monoxide may, in some cases, be mixed with crystals of sulphate of magnesium prior to the formation of the paste as above described.

The resultant paste has all the characteristics of one made up with a high percentage glycerine. It can be readily formed into a positive plate of great hardness and cohesion, which has extreme porosity and high capacity, and is capable of being charged and discharged at high rates.

Further, an accumulator employing plates having active material prepared in accordance with the invention, has been found to be superior to any accumulator of which the paste is mixed with diluted sulphuric acid or a solution of ammonia or sulphate of magnesium alone or mixed with glycerine present in a small proportion only.

Although as above stated the glycerine is used preferably at 75% the normal commercial strength it is possible to obtain very good results with 70% and excellent results with 80%, even with the full commercial strength of glycerine a very good plate may be formed, although somewhat troublesome to form. With a mixture of glycerine at half commercial strength and half water quite good results are obtained, but inferior to 75% of glycerine and 25% of water.

Claims—

1. A process of forming a plastic mass for accumulator plates which consists in saturating a mixture composed of a major portion of glycerine and a minor portion of water, with sulphate of magnesium, mixing with said saturated solution a quantity of powdered lead monoxide and working the same into a stiff paste.

2. A process for forming a plastic mass for accumulator plates which consists in saturating a mixture composed of substantially 75% glycerine and 25% water, with sulphate of magnesium, mixing with said saturated solution, a quantity of powdered lead monoxide and working the same into a stiff paste.

HENRY LEITNER.